2 Sheets--Sheet 1.
R. BURDETT.
Reed-Organs.
No. 5,485. Reissued July 15, 1873.
Fig. I.
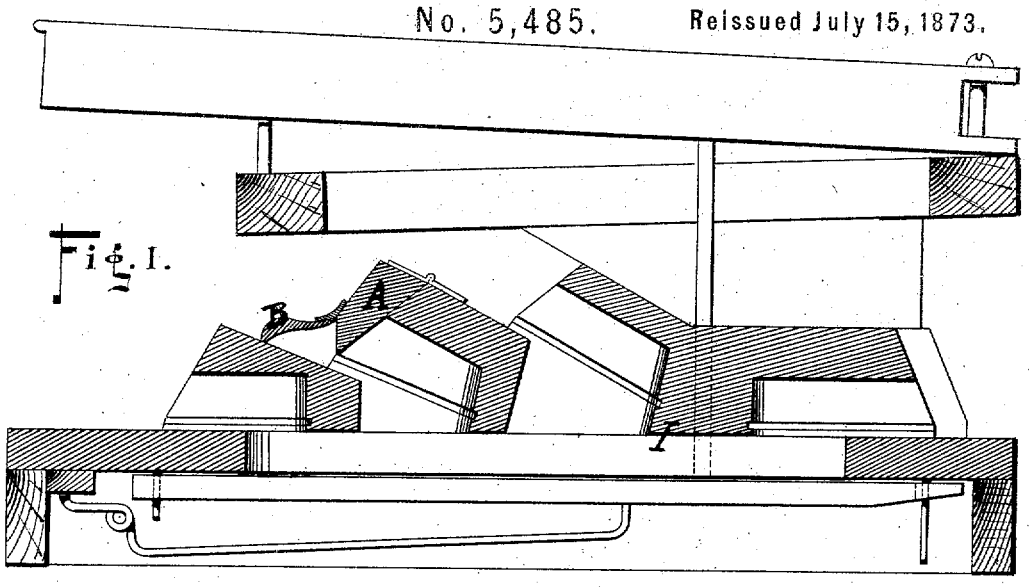
Fig. II.
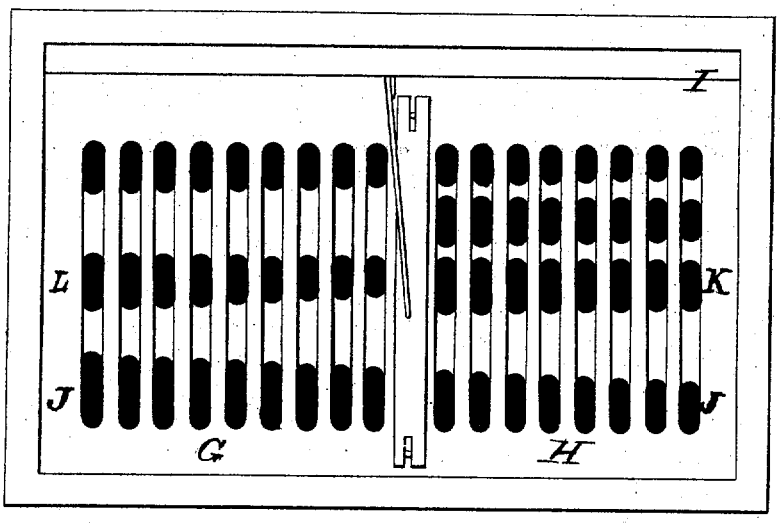
Attest;
C. W. Chapman.
F. W. Wentzel
Inventor;
Riley Burdett
by his attorney
C. C. Converse
AM. PHOTO-LITHOGRAPHIC CO. N.Y. (OSBORNE'S PROCESS.)

R. BURDETT.
Reed-Organs.
No. 5,485. Reissued July 15, 1873.
Fig. III.
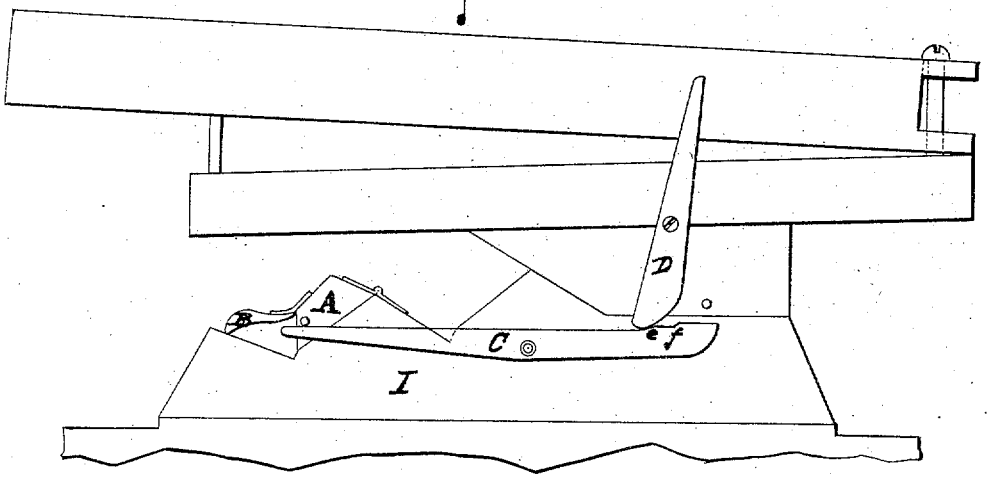
Fig. IV.
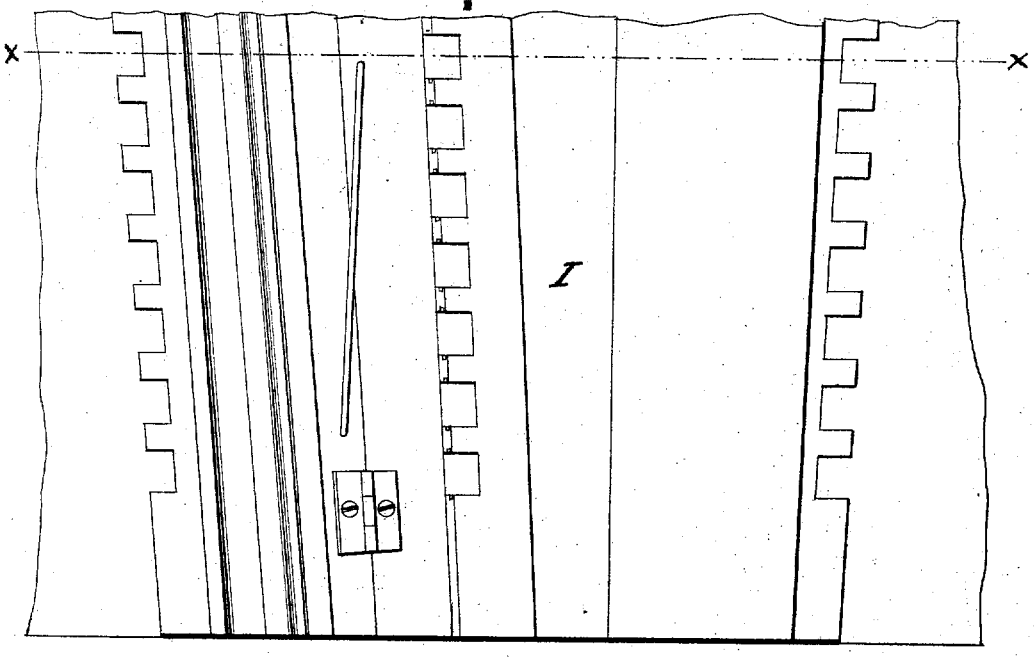
Attest;
C. W. Chapman.
F. W. Mittelf
Inventor
Riley Burdett
by his attorney
C C Converse
AM. PHOTO-LITHOGRAPHIC CO. N.Y. (OSBORNE'S PROCESS)

UNITED STATES PATENT OFFICE.

RILEY BURDETT, OF ERIE, PENNSYLVANIA.

IMPROVEMENT IN REED-ORGANS.

Specification forming part of Letters Patent No. 135,687, dated February 11, 1873; reissue No. 5,485, dated July 15, 1873; application filed June 27, 1873.

*To all whom it may concern:*

Be it known that I, RILEY BURDETT, of the city and county of Erie and State of Pennsylvania, have invented certain Improvements in Reed-Organs, of which the following is a specification:

My invention consists in the attachment of a veil to the reed-mute, which veil is so adjusted as to remain closed while admitting of the partial opening of the mute, thereby giving the tone a peculiar and admirable quality; and my invention further consists in the construction of the reed-board, as hereinafter set forth.

Figure 1 of the drawing is a cross-section of the reed-board upon the line *x x* in Fig. 4. Fig. 2 is a plan of the under side of said board. Fig. 3 is a side elevation of the mute and veil. Fig. 4 is a plan of the reed-board.

A is the mute, placed over the reed-cells to control the passage of air through them. B is the veil, attached to the mute A by means of a flexible band of leather or other suitable material. C is a lever communicating with the mute A. D is a lever, to which the stop-knob is attached, which operates the mute A and the veil B. *e* is a portion of the lever C, on which the lever D acts when partially opening the mute A. *f* is a portion of the lever C, adjoining the portion *e* thereof, to which the lever D passes in order to fully open the mute A and raise the veil B, and thus free the tone-current. G, H, and J are the air-passages to the eight-foot sets of reeds back of the tracker-pins. K shows the air-passages to the sixteen-foot short sets of reeds. L designates the air-passages to the two-foot partial sets of reeds. I is the reed-board.

A reed-board thus constructed and arranged as to its reed-sets places at the organist's command a great variety of new and beautiful musical resources, thus increasing the uses of the reed-organ, and without rendering necessary any change in the ordinary method for manipulating it.

The effect of the veil B is obtained by drawing the lever D by means of a stop-knob, thereby partially opening the stop to which this veil is attached so as to intercept the tone-current. When the ordinary effect of the stop to which the veil is attached is desired, the lever C is operated by an independent stop-knob, and fully opened so as to raise the veil and free the tone-current. As this veil may be attached to any stop its use is wide and valuable.

I claim—

1. The veil B, in combination with the reed-mute, to allow of a partial or full opening thereof, substantially as described.

2. The reed-board I having three, either full or partial, sets of reeds in front of the tracker-pins, two of which sets enter the reed-board obliquely, substantially as shown.

RILEY BURDETT.

Witnesses:
F. W. METCALF,
CHARLES C. CONVERSE.